United States Patent
Lin et al.

(10) Patent No.: US 7,480,758 B2
(45) Date of Patent: Jan. 20, 2009

(54) METHOD AND APPARATUS FOR AUTOMATICALLY SWITCHING BETWEEN USB HOST AND DEVICE

(75) Inventors: Peng-Fei Lin, Hsinchu (TW); Kuo-Chen Chuang, Hsinchu (TW)

(73) Assignee: MOAI Electronics Corporation, Hsinchu (TW)

( * ) Notice: Subject to any disclaimer, the term of this patent is extended or adjusted under 35 U.S.C. 154(b) by 181 days.

(21) Appl. No.: 11/682,884

(22) Filed: Mar. 7, 2007

(65) Prior Publication Data

US 2008/0222341 A1 Sep. 11, 2008

(51) Int. Cl.
*G06F 13/00* (2006.01)
(52) U.S. Cl. .............. 710/316; 710/8; 710/11; 710/14; 710/104; 710/313
(58) Field of Classification Search ............ 710/8, 710/10–12, 14, 104, 313, 316
See application file for complete search history.

(56) References Cited

U.S. PATENT DOCUMENTS

2006/0080490 A1* 4/2006 Tang .................. 710/313
2007/0033308 A1* 2/2007 Teng et al. .............. 710/62
2007/0167069 A1* 7/2007 Murakami ............... 439/502

OTHER PUBLICATIONS

On-The-Go Supplement to the USB 2.0 Specification, Revision 1.0a; USB Implementers Forum, Inc. (USB-IF); Jun. 24, 2003; pp. 50-69.*

* cited by examiner

*Primary Examiner*—Glenn A Auve

(57) ABSTRACT

An apparatus and method for automatically switching between USB host and device is provided. In a device with a USB interface, the present invention automatically switches between a USB host and USB device by detecting the handshake protocol of the D+ and D− pins of the USB interface. The apparatus for automatically switching between USB host and device includes ah host mode element, a device mode element, a random auto-switcher, and a detection element. The random auto-switcher switches the connection to the host mode element or the device mode element at random time. The detection element monitors the handshake protocol of the D+ and D− pins of USB interface and the external USB-interface device to determine whether the host mode or the device mode is in use. When the present invention detects the external USB-interfaced device is a host, the present invention switches to become a USB device. Similarly, when the present invention detects the external USB-interfaced device is a USB device, the present invention switches to become a USB host.

8 Claims, 6 Drawing Sheets

METHOD AND APPARATUS FOR AUTOMATICALLY SWITCHING BETWEEN USB HOST AND DEVICE

FIELD OF THE INVENTION

The present invention generally relates to a method and apparatus for automatically switching between USB host and device, and more specifically to a method and apparatus for automatically switching between USB host and device by detecting USB handshake protocol to switch between a USB host and a USB device.

BACKGROUND OF THE INVENTION

The universal serial bus (USB) interface is turning into a standard interface for portable devices. However, the original design of USB is targeting PC host. Conventionally, USB is used as an interface between a PC host and a peripheral device. The peripheral devices cannot be connected to one another with USB interface. For example, as shown in FIG. 1, PDA 103, digital camera 104, USB keyboard 105, and USB mouse 106 are all connected to PC host 101 through hub 102a, 102b.

The Universal Serial Bus Implementers Forum (USB-IF) chose the client-server architecture in defining the USB architecture. That is, the more difficult and complicated processing are left to the server, i.e., PC, while keeping the clients, i.e., the peripherals, as simple as possible. The former is called USB host, and the latter is called USB device. However, as more and more USB devices are developed and the functionality of portable electronic devices improves, it becomes restrictive for some USB devices to stay connected to a USB host. Therefore, USB-IF, based on the original USB specification, defines a USB inter-connection standard, called On-The-Go (OTG).

USB OTG is not independent of USB2.0. Instead, USB OTG provides a way for the USB device to break off from USB host. The USB OTG 1.0 specification provides a concept of Dual-Role device. In other words, an OTG device can be used as a host in addition to as a device. Hence, a USB device can be used in conjunction with a USB OTG device to form a point-to-point client-server connection.

The USB OTG device uses a mini-AB connector, and an ID pin is added to the interface. The ID pin is used to identify which one of the two connected USB OTG devices is the controller, or the controlled, As shown in FIG. 2, while the Device connects to Min-A Plug, the ID pin 201a is connected to ground and the Device is to be the USB OTG Host. While the other device which connects to Mini_B plug, keep the ID pin 210a floating to be USB OTG Device. In the mean time, USB OTG host 201 supplies power through VBUS pin to USB OTG device 210.

As USB OTG must rely on the ID pin to determine the role each plays in the connection, it is inconvenient for the users who are not familiar with mini-AB connector as the user may confuse the setting of ID pin and the USB OTG devices may not function correctly.

SUMMARY OF THE INVENTION

The primary object of the present invention is to provide a method and apparatus for automatically switching between USB host and device no matter just use USB standard or OTG connector. The present invention provides a device with a USB interface, by detecting the handshake protocol of the D+ and D− pins of the USB interface to automatically switch between a USB host and a USB device.

The apparatus for automatically switching between USB host and device of the present invention includes ah host mode element, a device mode element, a random auto-switcher, and a detection element. The random auto-switcher switches the connection to the host mode element or the device mode element at random time so that the USB-interfaced device randomly becomes a USB host or a USB device. The detection element is connected to the random auto-switcher, the VBUS, D+ and D− pins of the USB interface.

When the auto-switcher switches to the host mode element or the device mode element, the random auto-switcher informs the detection element to monitor the handshake protocol of the D+ and D− pins of USB interface and the external USB-interface device to determine whether the host mode or the device mode is in use.

According to the present invention, the two connected USB devices, either standard USB interface or USB OTG interface, can both communicate with each other. Because when the present invention detects the external USB-interfaced device is a host, the present invention switches to become a USB device. Similarly, when the present invention detects the external USB-interfaced device is a USB device, the present invention switches to become a USB host.

When a USB 2.0 device platform with the present invention is connected to a high speed or full speed USB device, and the random auto-switcher of the present invention switches to host mode element, the detection element monitors the handshake protocol of the D+ and D− pins of the USB 2.0 interface and the external USB-interfaced device, and the handshake protocol matches the host protocol. Therefore, the external USB-interfaced device is determined to be a USB device, and the random auto-switcher in the USB 2.0 device platform will not switch to device mode element and the USB 2.0 device platform stays as a USB host.

On the other hand, if the random auto-switcher initially switches to the device mode element, the detection element can not complete the handshake because the external USB-interfaced device is a USB device and the detected handshake protocol does not match. Due to the fail condition, the random auto-switcher will terminate the detection and switch to the host mode element preparing for the new start detection.

The foregoing and other objects, features, aspects and advantages of the present invention will become better understood from a careful reading of a detailed description provided herein below with appropriate reference to the accompanying drawings.

BRIEF DESCRIPTION OF THE DRAWINGS

The present invention can be understood in more detail by reading the subsequent detailed description in conjunction with the examples and references made to the accompanying drawings, wherein.

DETAILED DESCRIPTION OF THE PREFERRED EMBODIMENTS

Figure 1:
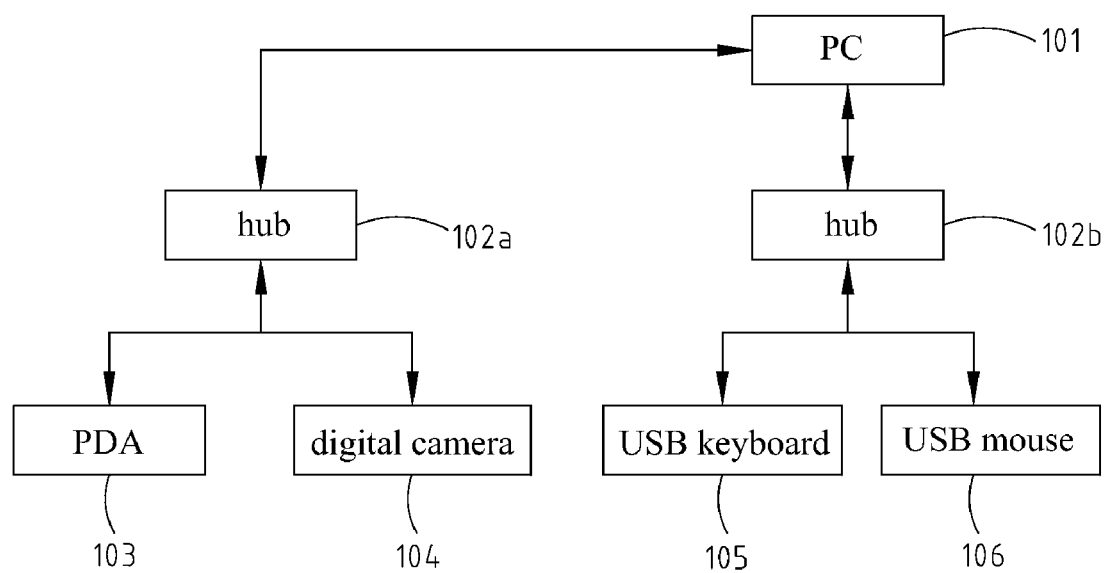
FIG. 1 shows a schematic view of a conventional USB architecture with host and peripheral devices.
Figure 2:
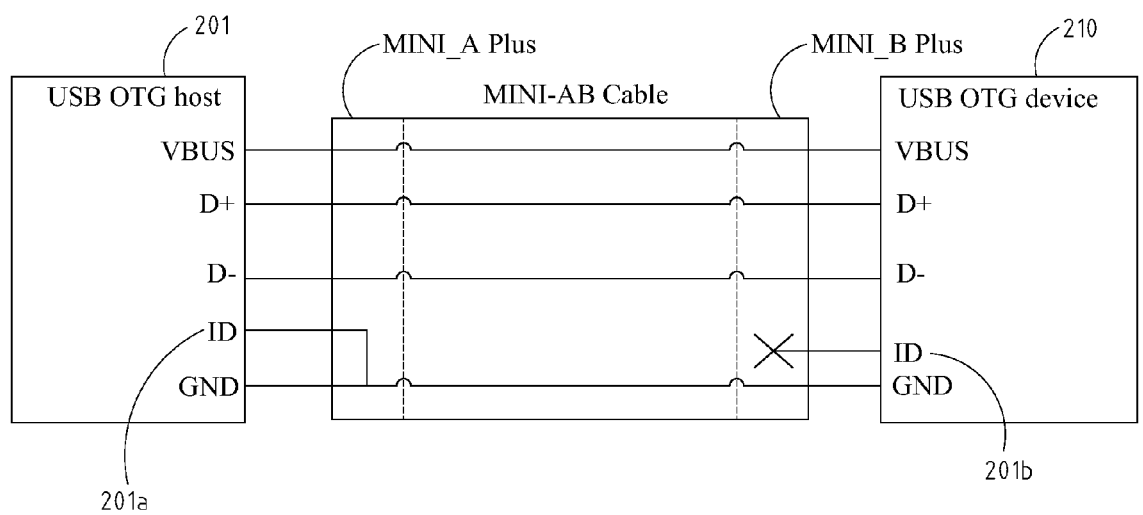
FIG. 2 shows a schematic view of two USB OTG devices using ID pin to differentiate host from device.
Figure 3:
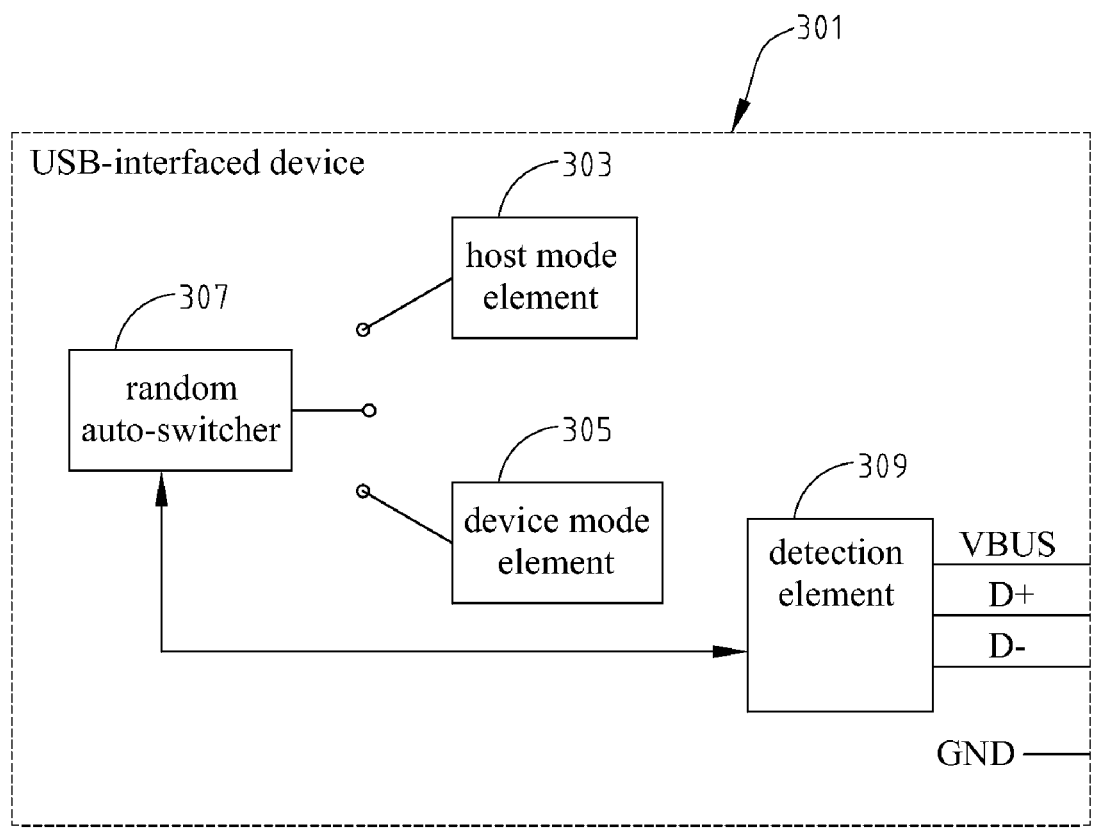
FIG. 3 shows a schematic view of an embodiment of the apparatus for automatically switching between USB host and device of the present invention.

FIG. 3 shows a schematic view of an embodiment of the apparatus for automatically switching between USB host and device of the present invention. The present invention is applied in a device 301 with a USB interface. As shown in FIG. 3, the apparatus for automatically switching between USB host and device includes a host mode element 303, a device mode element 305, a random auto-switcher 307 and a detection element 309. Random auto-switcher 307 switches the connection to host mode element 303 or device mode element 305 at random time so that USB-interfaced device 301 randomly becomes a USB host or a USB device. Detection element 309 is connected to random auto-switcher 307, the VBUS, D+ and D− pins of the USB interface.

When random auto-switcher 307 switches to host mode element 303 or device mode element 305, random auto-switcher 307 informs detection element 309 to monitor the handshake protocol of the D+ and D− pins of USB interface and the external USB-interface device to determine whether the host mode or the device mode is in use.

Figure 4:
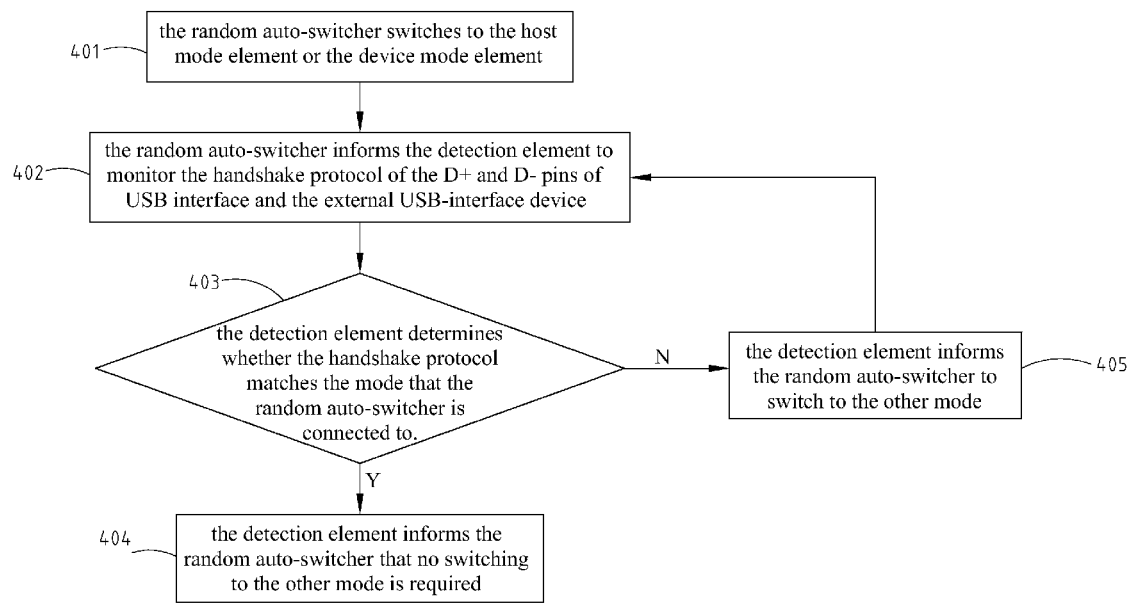
FIG. 4 shows a flowchart of the method for automatically switching between USB host and device of the present invention.

FIG. 4 shows a flowchart of the method for automatically switching between USB host and device of the present invention. As shown in FIG. 4, step 401 is for the random auto-switcher switches to the host mode element or the device mode element. Step 402 is for the random auto-switcher to inform the detection element to monitor the handshake protocol of the D+ and D− pins of USB interface and the external USB-interface device. Step 403 is for the detection element to determine whether the handshake protocol matches the mode that the random auto-switcher is connected to. If matched, step 404 is for the detection element to inform the random auto-switcher that no switching to the other mode is required. Otherwise, step 405 is for the detection element to inform the random auto-switcher to switch to the other mode, and repeat step 402.

Figure 5:
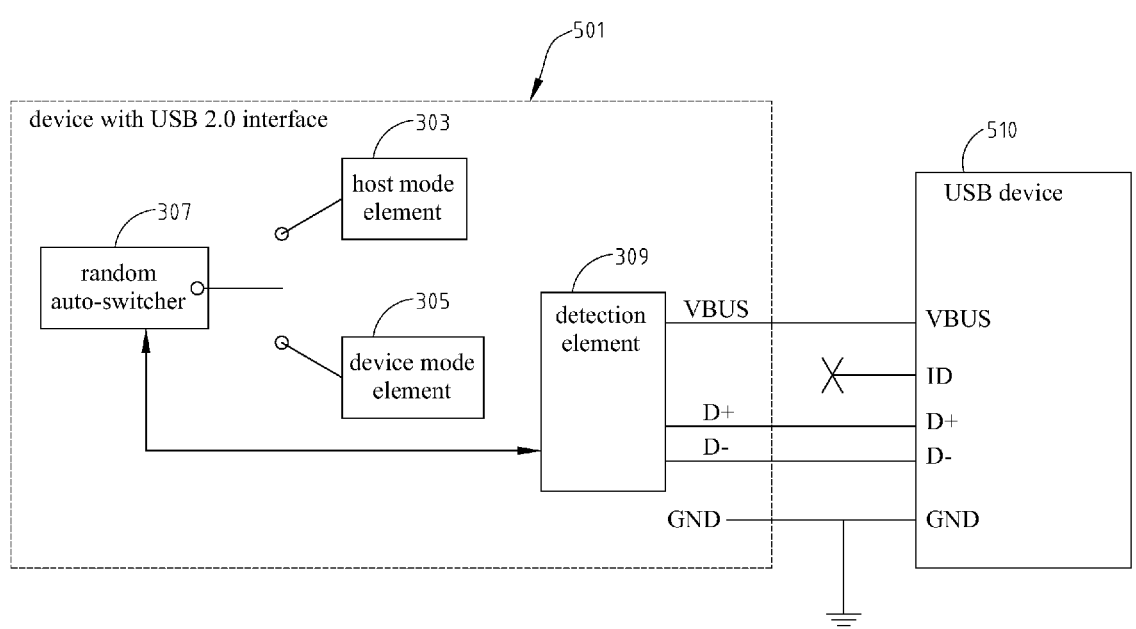
FIG. 5 shows an application of the present invention to a device 501 with a USB 2.0 interface.

FIG. 5 shows an application of the present invention to a device 501 with a USB 2.0 interface. Device 501 is connected to a high speed or a full speed USB device 510, and the connecter in use is a serial A, serial B or mini-AB. The apparatus of the present invention includes a host mode element 303, a device mode element 305, a random auto-switcher 307 and a detection element 309.

Figure 6:
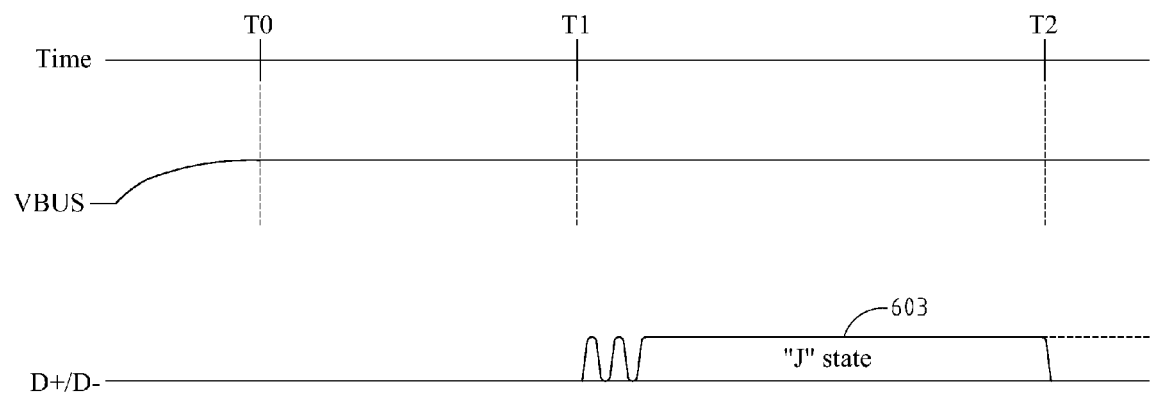
FIG. 6 shows a schematic view of the handshake protocol between the present invention and a USB device.

When random auto-switcher 307 switches to host mode element 303, random auto-switcher 307 informs detection element 309 to monitor the handshake protocol of the D+ and D− pins of the USB 2.0 interface and external USB device 510. Without the loss of generality, the handshake protocol is shown in FIG. 6. As shown in FIG. 6, the device platform 501 with USB 2.0 interface detects the connection with an external USB device 510, and the VBUS pin starts to send a voltage signal to the external USB device. After USB device 510 receives the voltage signal from VBUS pin, USB device 510 must respond to device 501 within T1, e.g., 100 ms.

USB device 510 must turn on within T1-T2 and transmit the handshake protocol. USB device 510 sets the D+ pin to "1", and D− pin t "0", i.e., the "J" state 603 of the USB standard to match the high speed or full speed protocol. Therefore, detection element 309 of device 501 can detect that the external device is a USB device, and will inform random auto-switcher 307 to stay connected to host mode element 303. The VBUS pin starts to supply power to USB device 510. In the mean time, device 501 will reset USB device 510, and starts to transmit data following the USB-IF handshake protocol.

On the other hand, if random auto-switcher 307 initially switches to device mode element 305, device 501 is a USB device, and the VBUS pin will not output a voltage signal. When external USB device 510 is connected to device 501, random auto-switcher 307 informs detection element 309 to monitor the handshake protocol of D+ and D− pins of USB 2.0 interface and the external USB device. As the handshake protocol does not match the mode that random auto-switcher is connected to, detection element 309 informs random auto-switcher 307 to switch to host mode element 303 after a random period of time. After random auto-switcher 307 switches to host mode element 303, detection element 309 monitors the handshake protocol again, as shown in FIG. 6. As the detected handshake protocol matches the switched mode, the apparatus of the present invention achieves the object of automatically switching between USB host and device.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An apparatus for automatically switching between a USB host and a USB device, applicable to a device with USB interface, said apparatus comprising:
   a host mode element;
   a device mode element;
   a random auto-switcher, for switching between to said host mode element and said device mode element at random time; and
   a detection element, connected to said random auto-switcher, a VBUS pin, a D+ pin, and a D− pin of said USB interface.

2. The apparatus as claimed in claim 1, wherein said USB interface is USB1.0, USB 1.1, USB 2.0, USB OTG or any combination of the above.

3. The apparatus as claimed in claim 1, wherein said detection element monitors the handshake protocol between said D+ and D− pins of said USB interface and an external USB-interfaced device.

4. The apparatus as claimed in claim 3, wherein said handshake protocol meets the standard defined by USB-IF.

5. The apparatus as claimed in claim 1, wherein said detection element informs said random auto-switcher to switch between said host mode element and said device mode element.

6. The apparatus as claimed in claim 1, wherein said detection element informs said random auto-switcher to stop switching and stay in the current mode.

7. A method for automatically switching between a USB host and a USB device, applicable to a device with a USB interface, said method comprising the steps of:
   (a) a random auto-switcher randomly switching to a host mode element or a device mode element;
   (b) said random auto-switcher informing a detection element to monitor a handshake protocol between a D+ pin and a D− pin of said USB interface and an external USB-interfaced device;

(c) said detection element determining whether said handshake protocol matches a current mode of said random auto-switcher;

(d) if matched in said step (c), said detection element informing said random auto-switcher to stay in said current mode, and not to switch; and (e) if not matched in said step (c), said detection element informing said random auto-switcher to switch to the other mode, and then repeating said step (b).

8. The method as claimed in claim 7, wherein said handshake protocol meets the standard defined by USB-IF.

* * * * *